US012286818B2

(12) United States Patent
Chandramowle

(10) Patent No.: US 12,286,818 B2
(45) **Date of Patent: *Apr. 29, 2025**

(54) MAGNETICALLY-LOCKING RETRACTABLE TAG WITH ANTI-DEFEAT IMPACT PROTECTION

(71) Applicant: Sensormatic Electronics, LLC, Boca Raton, FL (US)

(72) Inventor: Gopal Chandramowle, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,676

(22) Filed: Apr. 4, 2023

(65) Prior Publication Data

US 2023/0243189 A1 Aug. 3, 2023

Related U.S. Application Data

(63) Continuation of application No. 16/738,847, filed on Jan. 9, 2020, now Pat. No. 11,624,212.

(60) Provisional application No. 62/791,612, filed on Jan. 11, 2019.

(51) Int. Cl.
*E05B 73/00* (2006.01)
*E05B 17/20* (2006.01)

(52) U.S. Cl.
CPC ...... *E05B 73/0017* (2013.01); *E05B 17/2092* (2013.01)

(58) Field of Classification Search
CPC ............ E05B 17/2084; E05B 17/2092; E05B 73/0017
See application file for complete search history.

(56) References Cited

U.S. PATENT DOCUMENTS

| | | | |
|---|---|---|---|
| 3,858,280 | A | 1/1975 | Martens |
| 4,483,049 | A | 11/1984 | Gustavsson et al. |
| 4,523,356 | A | 6/1985 | Charlot, Jr. |
| 4,531,264 | A | 7/1985 | Minasy |
| 4,649,397 | A | 3/1987 | Heaton et al. |
| 4,903,383 | A | 2/1990 | Gartshore |

(Continued)

FOREIGN PATENT DOCUMENTS

| | | | |
|---|---|---|---|
| CA | 2948157 | A1 | 9/2015 |
| CN | 2921218 | Y | 7/2007 |

(Continued)

OTHER PUBLICATIONS

International Search Report and Written Opinion in PCT/US2020/012960, mailed Mar. 31, 2020, 12 pages.

(Continued)

*Primary Examiner* — Christopher J Boswell
(74) *Attorney, Agent, or Firm* — ArentFox Schiff LLP

(57) ABSTRACT

Systems and methods for operating a security tag. The methods comprise: causing a plunger of the security tag to engage a latch of the security tag; preventing, by an anti-defeat structure of the security tag, a disengagement between the plunger and the latch when an impact force is applied to the security tag; and allowing, by the anti-defeat structure, the plunger to disengage the latch when a magnetic field is applied to the security tag.

7 Claims, 12 Drawing Sheets

(56) References Cited

U.S. PATENT DOCUMENTS

| | | | | | |
|---|---|---|---|---|---|
| 5,068,641 | A * | 11/1991 | Hogen Esch | E05B 73/0017 | 340/572.9 |
| 5,077,872 | A | 1/1992 | Guthammar | | |
| 5,497,639 | A | 3/1996 | Charlot, Jr. | | |
| 6,285,286 | B1 | 9/2001 | Tyren et al. | | |
| 7,073,236 | B2 | 7/2006 | Xue et al. | | |
| 7,808,386 | B1 * | 10/2010 | Sayegh | E05B 73/0017 | 235/385 |
| 8,051,686 | B2 | 11/2011 | Garner | | |
| 8,624,739 | B2 | 1/2014 | Forster | | |
| 9,790,715 | B2 * | 10/2017 | Bouan | E05B 73/0017 | |
| 10,301,852 | B2 | 5/2019 | Piccoli | | |
| 11,519,200 | B2 * | 12/2022 | Claeys | E05B 73/0017 | |
| 11,624,212 | B2 * | 4/2023 | Chandramowle | E05B 73/0017 | 70/1.5 |
| 11,846,123 | B2 * | 12/2023 | Claeys | E05B 73/0017 | |
| 2009/0139279 | A1 | 6/2009 | Garner | | |
| 2011/0266230 | A1 | 11/2011 | Carnevali | | |
| 2012/0000254 | A1 | 1/2012 | Zhao | | |
| 2016/0258192 | A1 | 9/2016 | Bouan | | |
| 2020/0347647 | A1 | 11/2020 | Lindholm et al. | | |
| 2021/0254371 | A1 | 8/2021 | Oltvai | | |
| 2022/0178176 | A1 * | 6/2022 | Muller | E05B 73/0017 | |
| 2023/0102380 | A1 * | 3/2023 | Müller | E05B 73/0017 | 340/6.1 |
| 2023/0154301 | A1 * | 5/2023 | Eden | E05B 73/0052 | 705/39 |

FOREIGN PATENT DOCUMENTS

| | | | |
|---|---|---|---|
| CN | 101091032 | A | 12/2007 |
| CN | 101131785 | A | 2/2008 |
| CN | 101668917 | A | 3/2010 |
| CN | 101669152 | A | 3/2010 |
| CN | 203825751 | A | 9/2014 |
| CN | 105190717 | A | 12/2015 |
| CN | 105579650 | A | 5/2016 |
| CN | 107924600 | A | 4/2018 |
| GB | 0945551 | A | 1/1964 |

OTHER PUBLICATIONS

Office Action received for Chinese Patent Application No. 202310250100.9, mailed on Apr. 20, 2024, 8 pages (4 pages of English Translation and 4 pages of Original Document).

* cited by examiner

MAGNETICALLY-LOCKING RETRACTABLE TAG WITH ANTI-DEFEAT IMPACT PROTECTION

CROSS-REFERENCE TO RELATED APPLICATIONS

The present application is a continuation application of and claims priority to U.S. non-provisional patent application Ser. No. 16/738,847, filed Jan. 9, 2020; which application claims the benefit of U.S. Provisional Pat. App. No. 62/791,612, filed on Jan. 11, 2019. The contents of each of which are incorporated herein in its entirety by reference.

FIELD

This document relates generally to security tags. More particularly, this document relates to systems and methods for providing magnetically-locking retractable tags with anti-defeat impact protection.

BACKGROUND

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an acousto-magnetic element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

One type of security tag can include a tag body which engages a tack. The tack usually includes a tack head and a sharpened pin extending from the tack head. In use, the pin is inserted through the article to be protected. The shank or lower part of the pin is then locked within a cooperating aperture formed through the housing of the tag body. In some scenarios, the tag body may contain a Radio Frequency Identification ("RFID") element or label. The RFID element can be interrogated by an RFID reader to obtain RFID data therefrom.

The security tag may be removed or detached from the article using a detaching unit. Examples of such detaching units are disclosed in U.S. Patent Publication No. 2014/0208559 ("the '559 patent application) and U.S. Pat. No. 7,391,327 ("the '327 patent"). The detaching units disclosed in the listed patents are designed to operate upon a two-part hard security tag. Such a security tag comprises a pin and a molded plastic enclosure housing EAS marker elements. During operation, the pin is inserted through an article to be protected (e.g., a piece of clothing) and into an aperture formed through at least one sidewall of the molded plastic enclosure. The pin is securely coupled to the molded plastic enclosure via a mechanical or magnetic locking mechanism disposed therein. The pin is released by a detaching unit via application of a magnetic field by a magnet or mechanical probe inserted through an aperture in the hard tag. The magnet or mechanical probe is normally in a non-detach position within the detaching unit. When the RFID enabled hard tag is inserted into the RFID detacher nest, a first magnetic field or mechanical clamp is applied to hold the tag in place while the POS transaction is verified. Once the transaction and payment have been verified, the second magnet or the mechanical probe is caused to travel from the non-detach position to a detach position so as to release the tag's locking mechanism (e.g., a clamp). The pin can now be removed from the tag. Once the pin is removed and the article is released, the security tag will be ejected or unclamped from the detacher nest.

The mechanical and magnetic locking mechanisms of the security tags have certain drawbacks. For example, magnetic locks suffer from a common problem which allows the lock to be momentarily unlatched when the security tag is impacted upon a hard surface. The amount of force required to cause unlocking is dependent upon the design of the lock, and more particularly upon a spring that is used to retain the lock in a latched condition. Lighter springs exerting less spring force are designed to work with lower strength magnetic detaching units and heavier springs exerting more spring force are designed to work with higher strength magnetic detaching units. But regardless of spring weight used, the un-authorized unlocking of security tags by striking them upon a surface is known problem. The spring which retains the security tags in a locked condition will compress and the lock will momentarily transition to an unlocked condition.

SUMMARY

The present disclosure concerns systems and methods for operating a security tag. The methods comprise: causing a plunger of the security tag to engage a latch of the security tag; preventing, by an anti-defeat structure of the security tag, a disengagement between the plunger and the latch when an impact force is applied to the security tag; and allowing, by the anti-defeat structure, the plunger to disengage the latch when a magnetic field is applied to the security tag.

The anti-defeat structure prevents the plunger's disengagement from the latch when an impact force is applied to the security tag by absorbing energy due to the impact force and releasing the energy to provide a reactionary impulse force in a direction towards the latch. The reactionary impulse force causes the plunger to be pushed in a direction towards the latch prior to when the plunger travels out of the latch as a result of the impact force.

In some scenarios, the anti-defeat structure comprises an impact mass that is resiliently biased towards the plunger by an impact spring. The impact mass is disposed between the plunger and the impact spring, and is in contact with the plunger at all times. The impact spring is in a compressed state when the energy is being absorbed by the anti-defeat structure, and transitions from the compressed state to an uncompressed state when the anti-defeat structure releases the energy. The impact spring causes the impact mass to apply a pushing force to the plunger as the energy is being released by the anti-defeat structure. The pushing force causes the plunger to travel towards the latch and remain engaged with the latch despite the application of the impact force.

The anti-defeat structure allows the plunger's disengagement from the latch when the magnetic field is being applied to the security tag by absorbing energy while the plunger is being attracted to a magnetic field source. The anti-defeat structure allows the plunger to travel a first distance in a direction away from the latch when the magnetic field is being applied to the security tag, and a second distance in a direction away from the latch when the impact force is being applied to the security tag. The first distance is greater than the second distance.

DESCRIPTION OF THE DRAWINGS

The present solution will be described with reference to the following drawing figures, in which like numerals represent like items throughout the figures.

DETAILED DESCRIPTION

Figure 1:
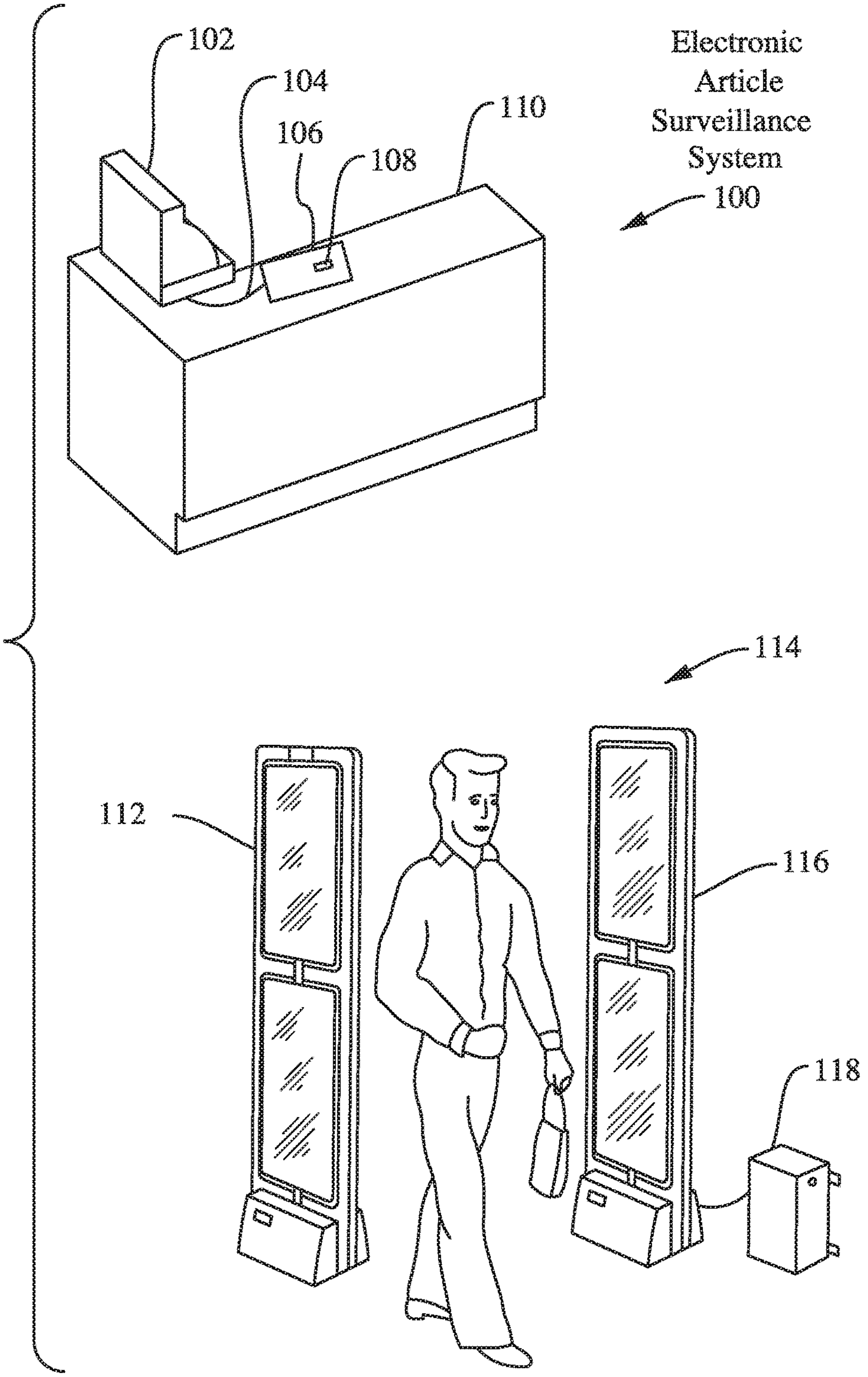
FIG. 1 is an illustration of an illustrative architecture for an EAS system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns a magnetic lock mechanism for a security tag that is resistant to defeat caused by forceful impacts, such as when the security tag is dropped or forcefully slammed on a hard surface. The security tag includes a housing formed of a rigid material, such as injection molded plastic. A pin channel is defined within the housing. The pin channel is arranged to removably receive therein a pin along a pin channel axis. A latch assembly is disposed within the housing which includes a latch disposed adjacent to the pin channel. The latch is configured to lockingly engage the pin when in a locked position, and is configured to release the pin when moved to an unlocked position.

The latch assembly also includes a plunger formed of material responsive to an applied magnetic field. The plunger has an engagement face which interacts with a base portion of the latch. A plunger guide channel is formed in the housing and is arranged to facilitate translational movement of the plunger along a guide channel axis. The plunger can thus move from a first position to a second position within the guide channel when the plunger is exposed to the applied magnetic field. A resilient member (such as a latch spring) is arranged to resiliently urge the engagement face of the plunger into contact with a base of the latch. The latch is responsive to the translational movement of the plunger from the unlocked position to the locked position to cause the latch to move from the locked position to the unlocked position described above.

An impulse mass is disposed within the housing so as to be adjacent to the end of the plunger opposite the engagement face. A portion of the housing is configured to hold the impulse mass in a variable given position relative to the housing. In some scenarios, a slot can be formed in the housing into which the impulse mass can be pressed into or otherwise inserted.

The impulse mass may have a recess configured to receive a portion of the end of the plunger to help prevent the plunger from being dislodged from the plunger guide channel. The impulse mass can be formed of metal, and is configured and arranged to absorb shock when the tag is dropped or forcefully slammed in an attempt to defeat the tag, thus preventing the plunger from being urged into the unlocking position.

An impulse spring is disposed between the housing walls and the impulse mass, or is otherwise positioned between a fixed member within the housing and the impulse mass. The impulse spring is arranged and positioned to axially bias the impulse mass against the plunger such that the plunger is urged towards the first position.

When the security tag is subjected to a dropping/slamming force, the impulse spring begins to oscillate as a result. When a forceful blow starts to displace the latch from the locking position, the impulse mass is slammed against the plunger, which transfers the force towards the latch mechanism, thereby biasing the latch mechanism in the locking position. As a result, the locking mechanism does not unlatch. The inventive arrangement therefore serves to utilize the destructive force applied to the tag to more securely lock the tag.

Referring now to FIG. 1, there is provided an illustration of an illustrative EAS system 100. EAS systems are well known in the art, and therefore will not be described in detail herein. Still, it should be understood that the present solution will be described herein in relation to an acousto-magnetic (or magnetostrictive) EAS system. The present solution is not limited in this regard. The EAS system 100 may alternatively include a magnetic EAS system, an RF EAS system, a microwave EAS system or other type of EAS system. In all cases, the EAS system 100 generally prevents the unauthorized removal of articles from a retail store.

In this regard, security tags 108 are securely coupled to articles (e.g., clothing, toys, and other merchandise) offered for sale by the retail store. Illustrative architectures of the security tags 108 will be described below in relation to FIGS. 3-9. At the exits of the retail store, detection equipment 114 sounds an alarm or otherwise alerts store employees when it senses an active security tag 108 in proximity thereto. Such an alarm or alert provide notification to store employees of an attempt to remove an article from the retail store without proper authorization.

In some scenarios, the detection equipment 114 comprises antenna pedestals 112, 116 and an electronic unit 118. The antenna pedestals 112, 116 are configured to create a surveillance zone at the exit or checkout lane of the retail store by transmitting an EAS interrogation signal. The EAS interrogation signal causes an active security tag 108 to produce a detectable response if an attempt is made to remove the article from the retail store. For example, the security tag 108 can cause perturbations in the interrogation signal, as will be described in detail below.

The antenna pedestals 112, 116 may also be configured to act as RFID readers. In these scenarios, the antenna pedestals 112, 116 transmit an RFID interrogation signal for purposes of obtaining RFID data from the active security tag 108. The RFID data can include, but is not limited to, a unique identifier for the active security tag 108. In other scenarios, these RFID functions are provided by devices separate and apart from the antenna pedestals.

The security tag 108 can be deactivated and detached from the article using a detaching unit 106. Typically, the security tag 108 is removed or detached from the articles by store employees when the corresponding article has been purchased or has been otherwise authorized for removal from the retail store. The detaching unit 106 is located at a checkout counter 110 of the retail store and communicatively coupled to a POS terminal 102 via a wired link 104. In general, the POS terminal 102 facilitates the purchase of articles from the retail store.

Detaching units and POS terminals are well known in the art, and therefore will not be described herein. The POS terminal 102 can include any known or to be known POS terminal with or without any modifications thereto. However, the detaching unit 106 includes any known or to be known detaching unit selected in accordance with a particular application which has some hardware and/or software modifications made thereto so as to facilitate the implementation of the present solution (which will become more evident below). The hardware and/or software modifications can include, but are not limited to, an inclusion of an RFID enabled device to facilitate RF communications with security tags and/or a coil for selectively emitting energy that is to be harvested by security tags.

In some cases, the detaching unit 106 is configured to operate as an RFID reader. As such, the detaching unit 106 may transmit an RFID interrogation signal for purposes of obtaining RFID data from a security tag. Upon receipt of the tag's unique identifier and/or an article's identifier, the detaching unit 106 communicates the same to the POS terminal 102. At the POS terminal 102, a determination is made as to whether the received identifier(s) is(are) valid for a security tag of the retail store. If it is determined that the received identifier(s) is(are) valid for a security tag of the retail store, then the POS terminal 102 notifies the detaching unit 106 that the same has been validated, and therefore the security tag 108 can be removed from the article.

At this time, the detaching unit 106 performs operations to apply a magnetic field to the security tag 108. In response to the magnetic field, a pin is released from a lock mechanism of the security tag 108. The pin is now able to be removed from the security tag, whereby the security tag is detached from an article.

Figure 2:
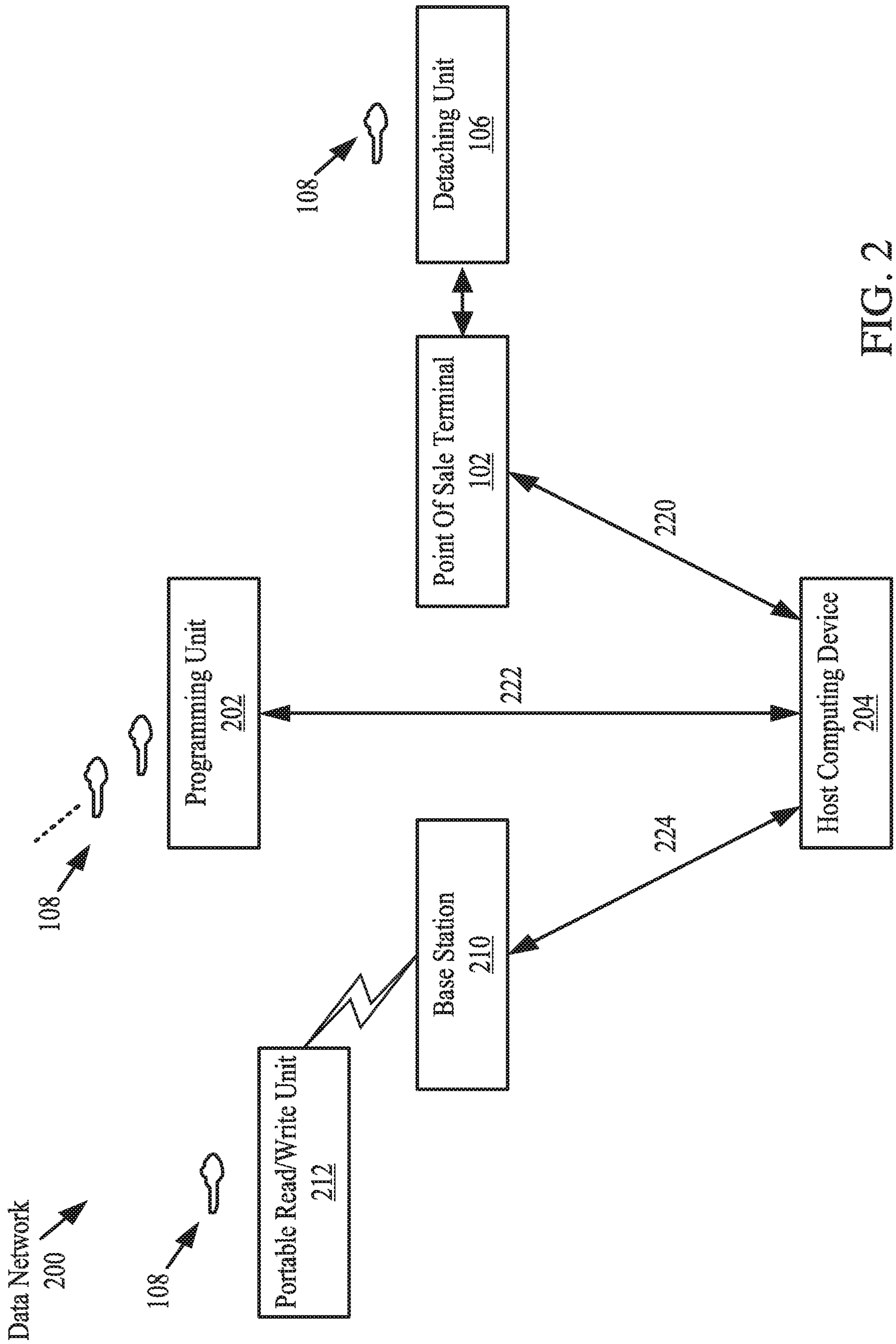
FIG. 2 is an illustration of an illustrative architecture for a data network.

Referring now to FIG. 2, there is provided an illustration of an illustrative architecture for a data network 200 in which the various components of the EAS system 100 are coupled together. Data network 200 comprises a host computing device 204 which stores data concerning at least one of merchandise identification, inventory, and pricing. A first data signal path 220 allows for two-way data communication between the host computing device 204 and the POS terminal 102. A second data signal path 222 permits data communication between the host computing device 204 and a programming unit 202. The programming unit 202 is generally configured to write product identifying data and other information into memory of the security tag 108. A third data signal path 224 permits data communication between the host computing device 204 and a base station 210. The base station 210 is in wireless communication with a portable read/write unit 212. The portable read/write unit 212 reads data from the security tags for purposes of determining the inventory of the retail store, as well as writes data to the security tags. Data can be written to the security tags when they are applied to articles of merchandise.

Referring now to FIGS. 3-6, there are provided illustrations of an illustrative architecture for the security tag 108. Security tag 108 can include more or less components than that shown in FIGS. 3-6. However, the components shown are sufficient to disclose an illustrative embodiment implementing the present solution. Some or all of the components of the security tag 108 can be implemented in hardware, software and/or a combination of hardware and software. The hardware includes, but is not limited to, one or more electronic circuits. The hardware architecture of FIGS. 3-6 represents a representative security tag configured to facilitate the prevention of an unauthorized removal of an article from a retail store facility.

Figure 3:
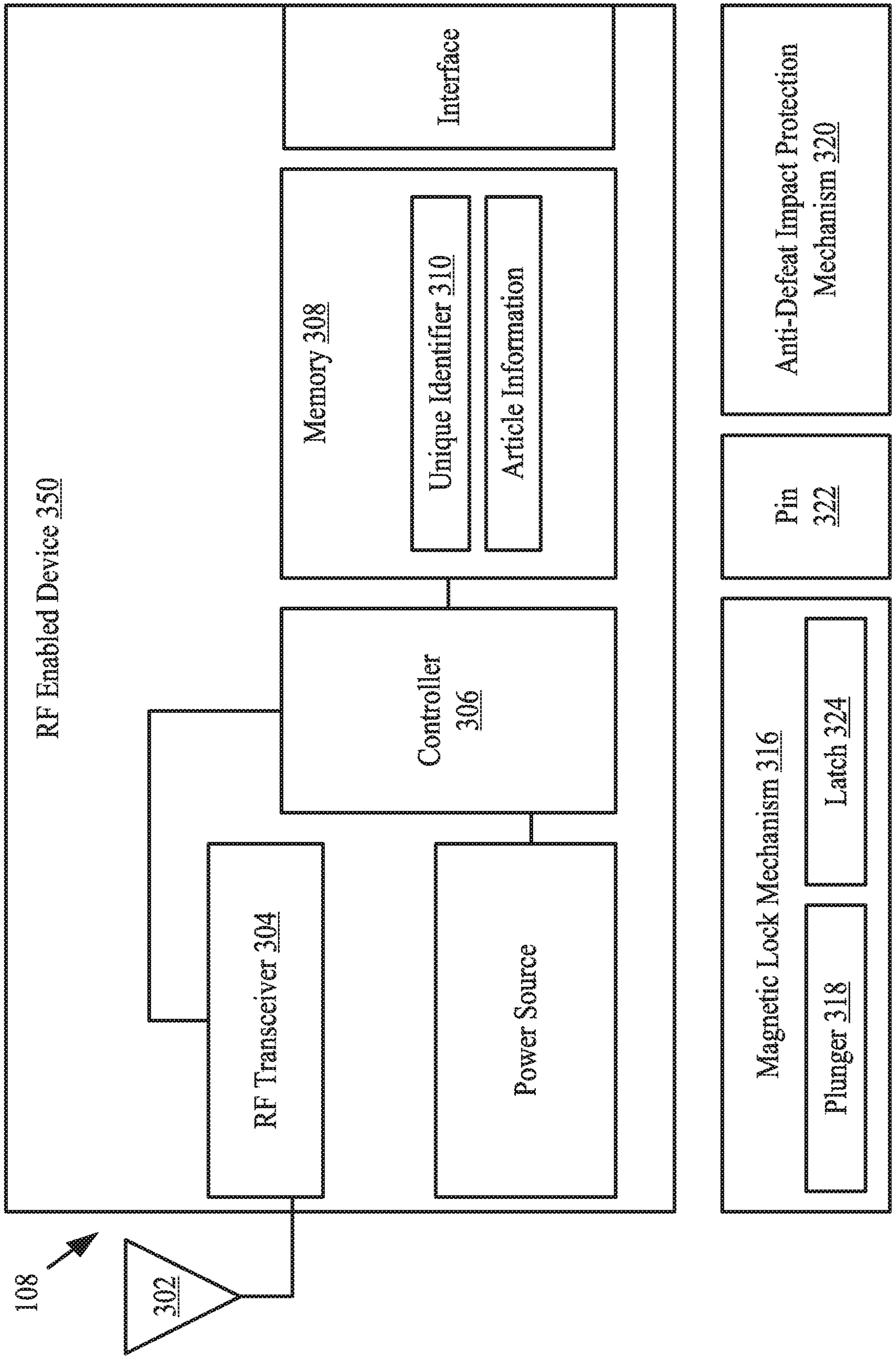
FIG. 3 is an illustration of an illustrative architecture for the security tag show in FIGS. 1-2.

As shown in FIG. 3, the security tag 108 comprises an antenna 302 and an RF enabled device 350. The RF enabled device 350 allows data to be exchanged with the external device via RF technology. The antenna 302 is configured to receive RF signals from the external device and transmit RF signals generated by the RF enabled device 350. The RF enabled device 350 comprises an RF transceiver 304. RF transceivers are well known in the art, and therefore will not be described herein. Any known or to be known RF transceiver can be used here.

The security tag 108 also comprises a magnetic lock mechanism 316 and a pin (or tack) 322 for securing the security tag to an article. Magnetic lock mechanisms and pins are well known in the art, and therefore will not be described here in detail. In some scenarios, the magnetic lock mechanism comprises a plunger 318 that transitions between an engaged position in which the plunger 318 prevents the pin (or tack) 322 from being removed from the security tag 108 to an unengaged position in which the pin (or tack) 322 is no longer prevented from being removed from the security tag 108 by the pin (or tack) 322. The pin (or tack) 322 is secured to the security tag 108 via a latch 324 of the magnetic lock mechanism 316 that is engaged by the plunger 318. The pin (or tack) 322 is released from the magnetic lock mechanism 316 when the plunger 318 is disengaged from the latch 324 via an application of a magnetic field to the magnetic lock mechanism 316. The magnetic field is generated by the detaching unit 106 during a detachment process.

During the detachment process, the RF transceiver 304 may receive an RF signal from the detaching unit 106. A controller 302 of the security tag 108 processes the received RF signal to extract information therein. This information can include, but is not limited to, a request for certain information (e.g., a unique identifier 310). If the extracted information includes a request for certain information, then the controller 306 may perform operations to retrieve a unique identifier 310 from memory 308. The retrieved information is then sent from the security tag 108 to the detaching unit 106 via an RF communication facilitated by the RF transceiver 304.

Memory 308 may be a volatile memory and/or a non-volatile memory. For example, the memory 308 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 308 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The security tag 108 further comprises an anti-defeat impact protection mechanism 320. The anti-defeat impact protection mechanism 320 is provided to prevent an unlocking of the magnetic lock mechanism 316 as a result of forceful impacts to the security tag 108. The manner in which the anti-defeat impact protection mechanism 320 prevents such unwanted unlocking will become evident as the discussion progresses.

Figure 4:
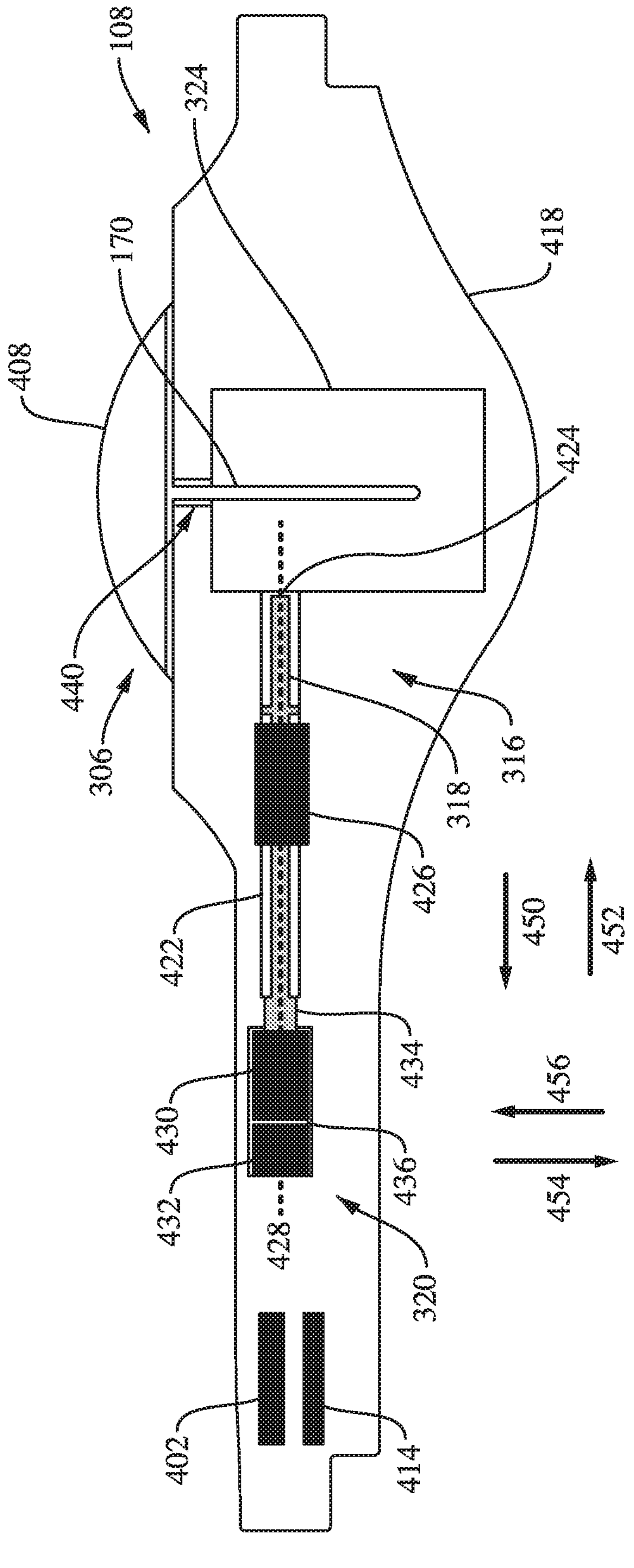
FIG. 4 is an illustrative cross sectional view of the security tag shown in FIGS. 1-3.
Figure 5:
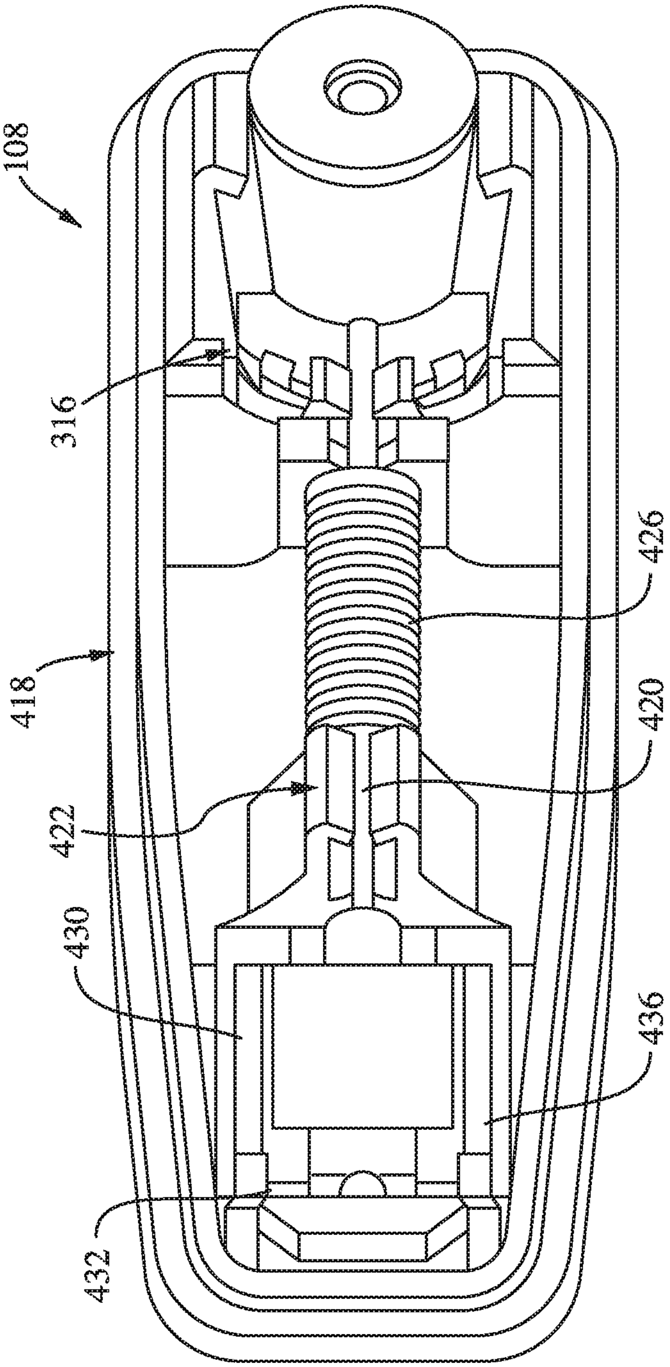
FIG. 5 is an illustrative top view of the security tag shown in FIGS. 1-4.
Figure 6:
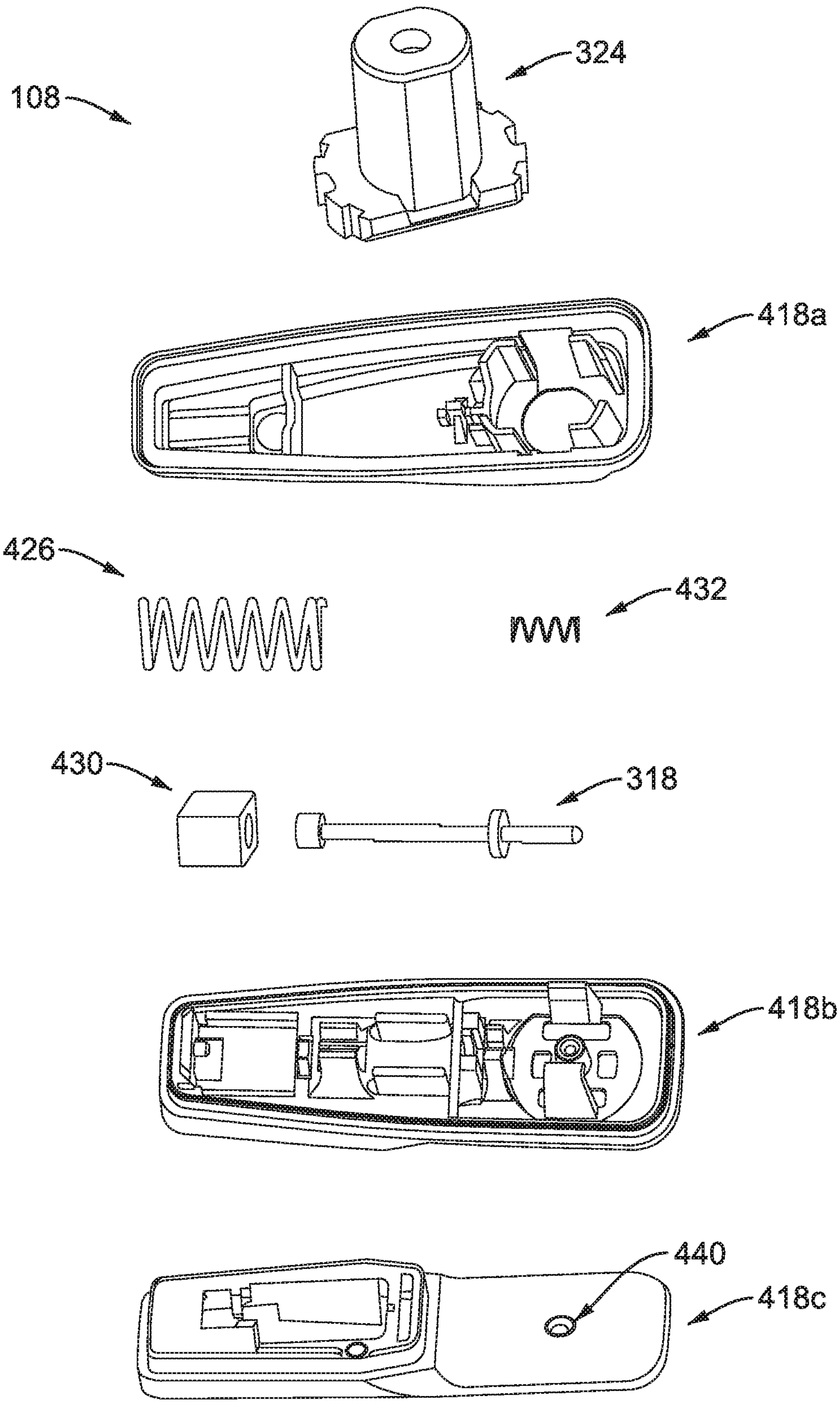
FIG. 6 is an exploded view of the security tag shown in FIGS. 1-5.

Referring now to FIG. 4, there is provided an illustration showing the pin (or tack) 306 removably coupled to the security tag 108. In this regard, it should be noted that the security tag 108 comprises a housing 418 which is at least partially hollow. The housing 418 can be formed from a rigid or semi-rigid material, such as plastic. The housing 418 can be formed of a plurality of parts 418*a*, 418*b*, 418*c* as shown in FIG. 6. The housing 418 has a recessed hole 440 formed therein into which the pin (or tack) 306 is inserted.

The pin (or tack) 306 comprises a head 408 and a shaft 410. The shaft 310 is inserted into the recessed hole 440 formed in the housing 318. The shaft 310 is held in position within the recessed hole 440 via the magnetic lock mechanism 316, which is mounted inside the housing 318. As noted above, the magnetic lock mechanism 316 comprises a plunger 318 and a latch 324. The magnetic lock mechanism 316 is in its locked position in FIG. 4. In this locked positon, the plunger 318 is in engagement with the latch 324 so as to removably couple the pin (or tack) 306 to the security tag 108.

The plunger 318 is actuated by or otherwise responsive to a magnetic field applied to the security tag 108. When actuated by the magnetic field, the plunger 318 moves in a direction 450 along axis 428 within a guide channel 422. In effect, the plunger 318 disengages the latch 324. The magnetic lock mechanism 316 is in its unlocked position (not shown) when the plunger 318 no longer engages the latch 324.

The plunger 318 moves in direction 452 within guide channel 422 when application of the magnetic field is discontinued. In this regard, it should be understood that the plunger 318 is resiliently biased in direction 452 by a resilient member 426 disposed along an elongate length of the plunger 318. Resilient member can include, but is not limited to a, spring. In the spring scenario, resilient member 426 is normally in an uncompressed state as shown in FIG. 4. When the plunger moves in direction 450, the plunger 318 causes the resilient member 426 to be compressed (not shown in FIG. 4). Thus, when the magnetic field is no longer applied to the security tag 108, the resilient member 426 transitions to its uncompressed state whereby the plunger 318 is automatically caused to return to engagement with the latch 324.

The anti-defeat impact protection mechanism 320 comprises an impulse mass 430 and an impulse spring 432. The impulse mass and/or spring can be formed of metal. These impulse components 430, 432 are tuned to allow the plunger 318 to disengage the latch 324 when the magnetic field is applied thereto, and prevent the plunger's 318 disengagement from the latch 324 as a result of an impact force being applied to the security tag 108. In this regard, the impulse mass 430 is in contact with an end 434 of the plunger 318, and disposed between the plunger 318 and the impulse spring 432. In some scenarios, the impulse mass 430 has an aperture (not shown in FIG. 4) formed therein into which a portion of plunger end 434 is inserted. A structure 436 is provided within which the impulse mass 430 and an impulse spring 432 are disposed. Both components 430, 432 are able to move in opposing directions 450, 452 within the structure 436, but are unable to move in opposing directions 454, 456 within structure 436.

When an impact force is applied to the security tag 108, the impulse mass 430 moves in direction 450, whereby the impulse spring 432 is compressed. The impulse spring 432 then oscillates for a brief period of time and returns to its uncompressed state shown in FIG. 4. Consequently, the anti-defeat impact protection mechanism 320 absorbs the shock caused by the impact force, and prevents the plunger 318 from disengaging the latch 324. More specifically, the impulse mass 430 transfers the image force towards the latch 324, thereby biasing the magnetic lock mechanism 316 into the locked position shown in FIG. 4. As a result, the magnetic lock mechanism 316 does not unlock or unlatch. Therefore, the anti-defeat impact protection mechanism 320 serves to utilize the destructive force applied to the security tag 108 to more securely lock the pin 306 within the security tag housing 418.

A magnetostrictive active EAS element 414 and a bias magnet 402 are optionally also disposed within the housing 418. These components 414, 402 may be the same as or similar to that disclosed in U.S. Pat. No. 4,510,489. In some scenarios, the resonant frequency of components 414, 402 is the same as the frequency at which the EAS system (e.g., EAS system 100 of FIG. 1) operates (e.g., 58 kHz). Additionally, the EAS element 414 is formed from thin, ribbon-shaped strips of substantially completely amorphous metal-metalloid alloy. The bias magnet 402 is formed from a rigid or semi-rigid ferromagnetic material. Embodiments are not limited to the particulars of these scenarios.

During operation, antenna pedestals (e.g., antenna pedestals 112, 116 of FIG. 1) of an EAS system (e.g., EAS system 100 of FIG. 1) emit periodic tonal bursts at a particular frequency (e.g., 58 kHz) that is the same as the resonance frequency of the amorphous strips (i.e., the EAS interrogation signal). This causes the strips to vibrate longitudinally by magnetostriction, and to continue to oscillate after the burst is over. The vibration causes a change in magnetism in the amorphous strips, which induces an AC voltage in an antenna structure (not shown in FIG. 3). The antenna structure (not shown in FIG. 3) converts the AC voltage into a radio wave. If the radio wave meets the required parameters (correct frequency, repetition, etc.), the alarm is activated.

Referring now to FIGS. 7-8, there are provided illustrations that are useful for understanding how the magnetic lock mechanism 316 operates without the anti-defeat impact protection mechanism 320 when an impact force is applied to security tag 108, and how the magnetic lock mechanism 316 operates with the anti-defeat impact protection mechanism 320 when an impact force is applied to security tag 108.

Figure 7A:
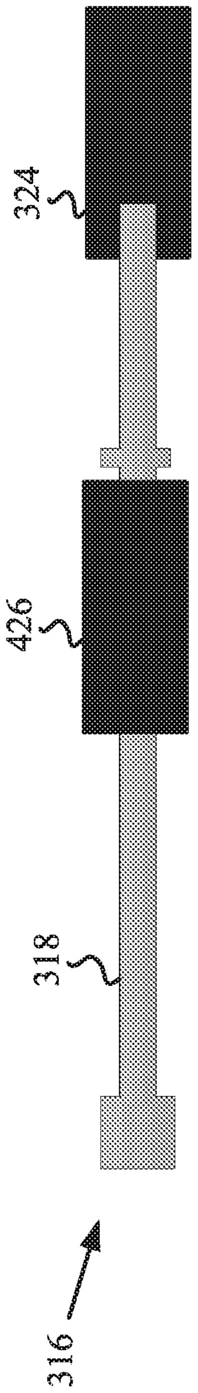
FIGS. 7A-7D (collectively referred to herein as "FIG. 7") provide illustrations that are useful for understanding how a magnetic lock mechanism operates without an anti-defeat impact protection mechanism when an impact force is applied to a security tag.

Referring now to FIG. 7A, an illustration is provided showing magnetic lock mechanism 316 in a locked or latched position. In the locked or latched position, the plunger 318 is in engagement with a latch 324. The resilient member 426 is in an uncompressed state.

Figure 7B:
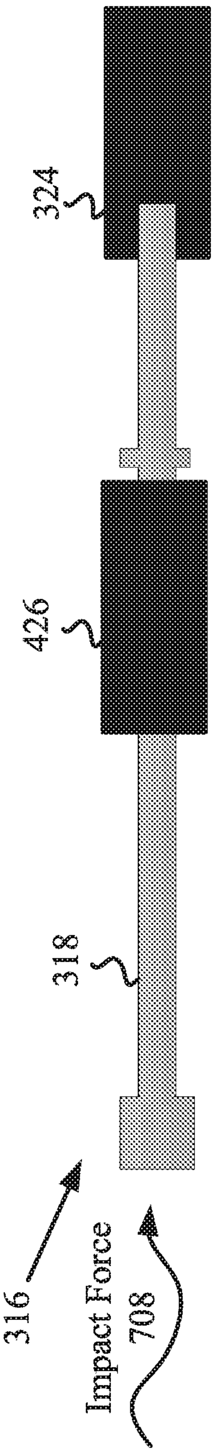
Figure 7C:
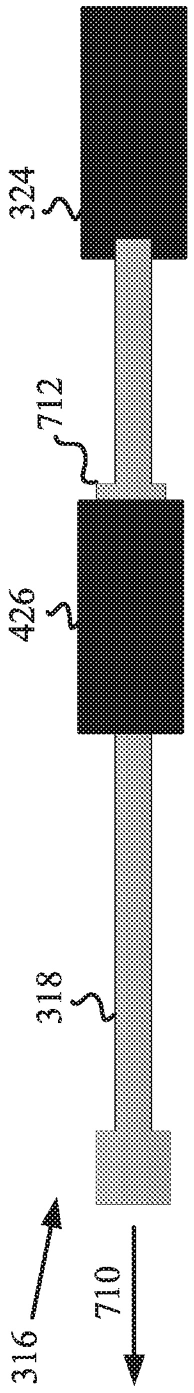
Figure 7D:
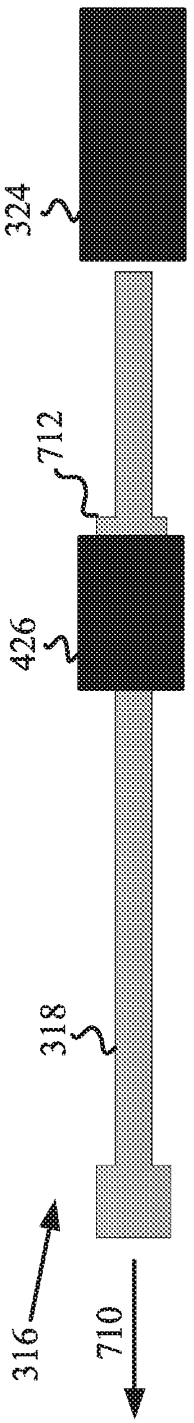

Referring now to FIG. 7B, an illustration is provided showing an application of an impact force 708 to the magnetic lock mechanism 316. As a result of this impact force 708, the plunger 318 moves in direction 710 as shown in FIGS. 7C-7D, whereby a flange 712 of the plunger 318 causes compression of the resilient member 426 and the plunger 318 disengages the latch 324. Consequently, the magnetic lock mechanism 316 is undesirably defeated as a result of the impact force 708. The anti-defeat impact protection mechanism 320 is provided to prevent such a defeat of the magnetic lock mechanism 316.

Figures 8A, 8B, 8C, 8D:
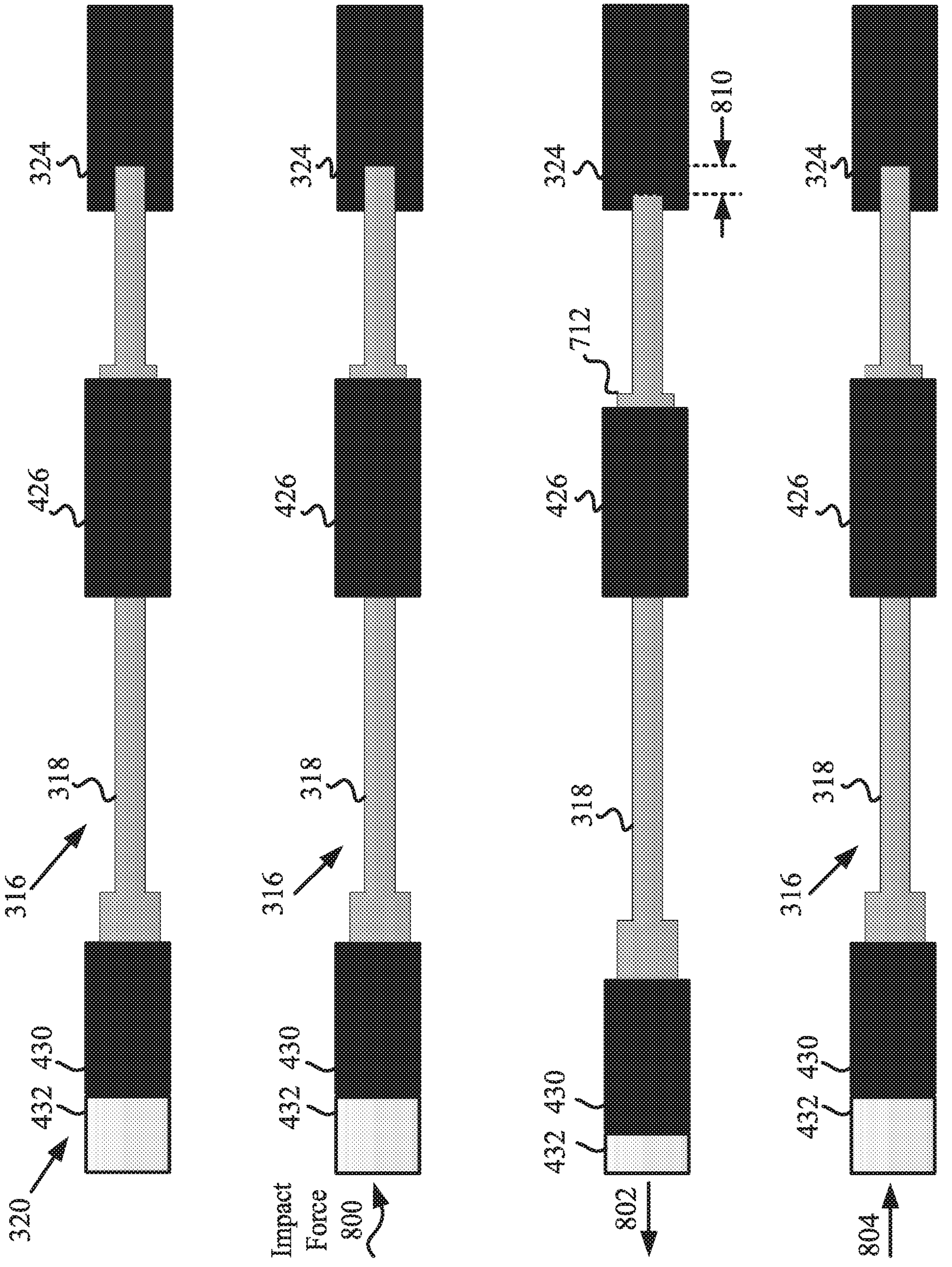
FIGS. 8A-8D (collectively referred to herein as "FIG. 8") provide illustrations that are useful for understanding how a magnetic lock mechanism operates with an anti-defeat impact protection mechanism when an impact force is applied to a security tag.

Referring now to FIG. 8A, there is provided an illustration showing the magnetic lock mechanism 316 in a locked or latched position. In the locked or latched position, the plunger 318 is in engagement with a latch 324. The resilient member 426 is in an uncompressed state. The resilient member 432 of the anti-defeat impact protection mechanism 320 is also in an uncompressed state, and the impulse mass 430 is at a first location relative to the latch 324.

Referring now to FIG. 8B, an illustration is provided showing an application of an impact force 800 to the magnetic lock mechanism 316 and the anti-defeat impact protection mechanism 320. As a result of this impact force 800, the plunger 318 moves in direction 802 as shown in FIGS. 7C-7D, whereby a flange 712 of the plunger 318 causes compression of the resilient member 426 and the impulse mass 430 causes compression of impulse spring 432 as shown in FIG. 7C. The impulse spring 432 absorbs energy during its compression, oscillates for a brief period of time, and then releases the energy while providing a reactionary impulse force in direction 804 as it returns to its uncompressed state. In effect, the impulse spring 432 resiliently biases the impulse mass 430 in direction 804 as shown in FIG. 7D. The resiliently biased impulse mass 430 applies a pushing force on the plunger 318, whereby the plunger 318 is caused to travel in direction 804 toward latch 324. Notably, the plunger 318 never disengages the latch 324 as a result of the impact force's application to the security tag 108.

Referring now to FIG. 9, there are provided illustrations that are useful for understanding how the magnetic lock mechanism 316 operates and the anti-defeat impact protection mechanism 320 operate when a magnetic field is applied to security tag 108 during a detachment process.

Figures 9A, 9B, 9C, 9D:
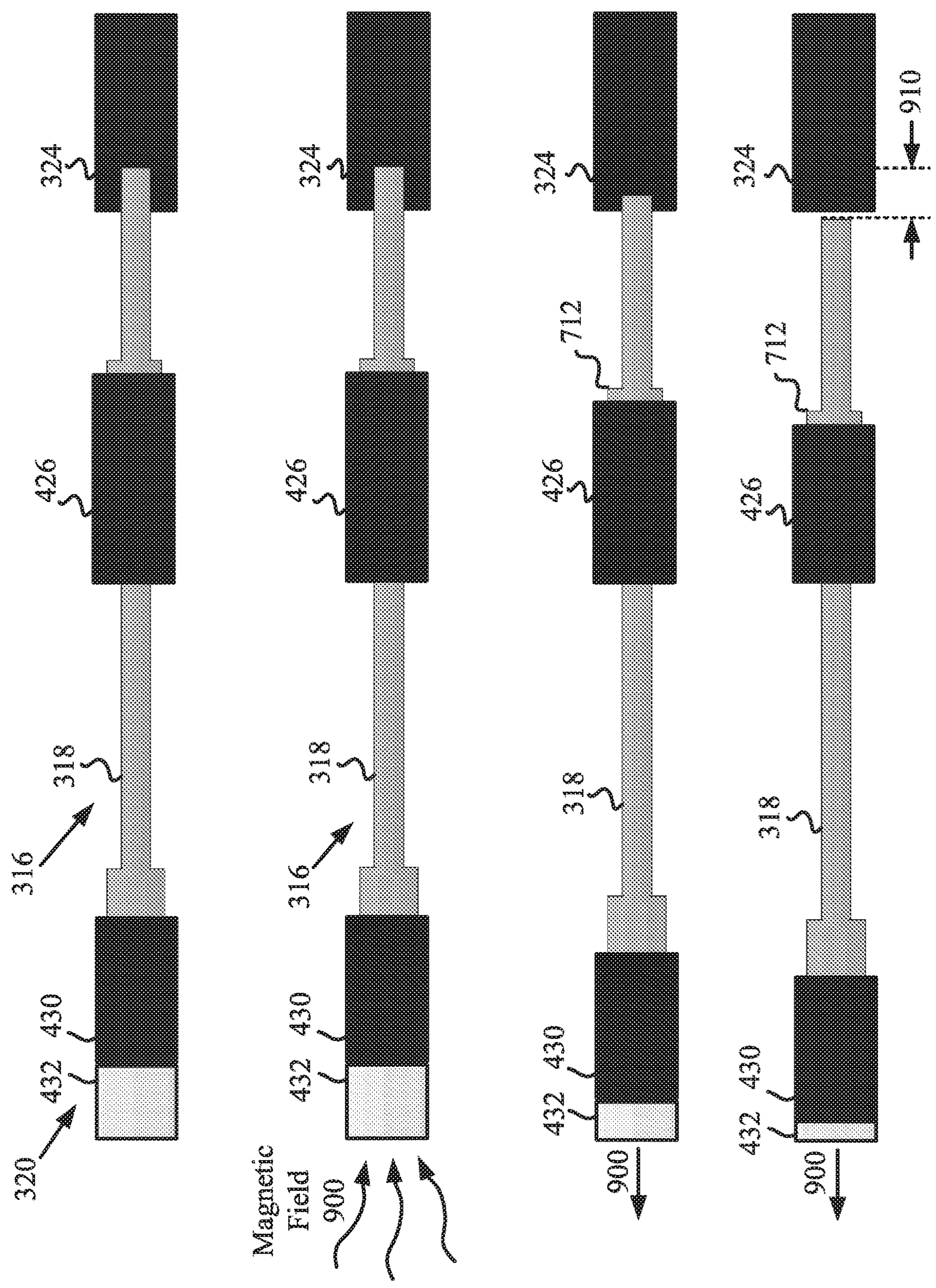
FIGS. 9A-9D (collectively referred to herein as "FIG. 9") provide illustrations that are useful for understanding how a magnetic lock mechanism and an anti-defeat impact protection mechanism operate when a magnetic field is applied to a security tag during a detachment process.

Referring now to FIG. 9A, there is provided an illustration showing the magnetic lock mechanism 316 in a locked or latched position. In the locked or latched position, the plunger 318 is in engagement with a latch 324. The resilient member 426 is in an uncompressed state. The resilient member 432 of the anti-defeat impact protection mechanism 320 is also in an uncompressed state, and the impulse mass 430 is at a first location relative to the latch 324.

Referring now to FIG. 9B, an illustration is provided showing an application of a magnetic field 900 to the anti-defeat impact protection mechanism 320 and the magnetic lock mechanism 316. As a result of the magnetic field 900, the impulse mass 430 and plunger 318 are attracted towards the magnetic field source. Accordingly, the impulse mass 430 and plunger 318 travel in direction 900 as shown in FIG. 9C, whereby the impulse mass 430 travels to a second location relative to the latch 324 and the plunger 318 disengages the latch 324 as shown in FIG. 9D. Notably, the anti-defeat structure allows the plunger 318 to travel a first distance 910 in a direction away from the latch 324 when the magnetic field 900 is being applied to the security tag 108 that is greater than a second distance 810 in the same direction that the anti-defeat structure allows the plunger 318 to travel when the impact force 800 is being applied to the security tag 108. When application of the magnetic field 900 is discontinued, the anti-defeat impact protection mechanism 320 and the magnetic lock mechanism 316 return to their positions shown in FIG. 9A.

Figure 10:
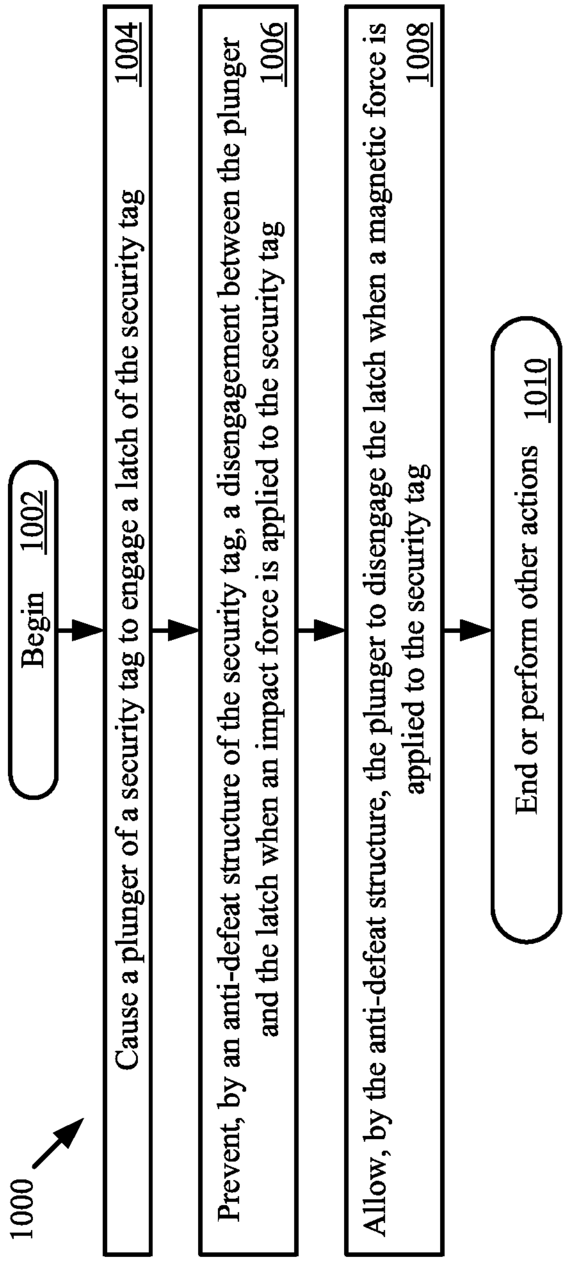
FIG. 10 provide a flow diagram of an illustrative method for operating a security tag.

Referring now to FIG. 10, there is provided a flow diagram of an illustrative method 500 for operating a security tag (e.g., security tag 108 of FIG. 1). Method 1000 begins with 1002 and continues with 1004 where a plunger (e.g., plunger 318 of FIGS. 3-9) of the security tag is caused to engage a latch (e.g., latch 324 of FIGS. 3-9) of the security tag. Next in 1006, an anti-defeat structure (e.g., anti-defeat impact protection mechanism 320 of FIGS. 3-9) of the security tag prevents a disengagement between the plunger and the latch when an impact force (e.g., impact force 800 of FIG. 8) is applied to the security tag. The anti-defeat structure prevents the plunger's disengagement from the latch when an impact force is applied to the security tag by absorbing energy due to the impact force and releasing the energy to provide a reactionary impulse force in a direction (e.g., direction 804 of FIG. 8) towards the latch. The reactionary impulse force causes the plunger to be pushed in a direction towards the latch prior to when the plunger travels out of the latch as a result of the impact force. In 1008, the anti-defeat structure allows the plunger to disengage the latch when a magnetic field (e.g., magnetic field 900 of FIG. 9) is applied to the security tag. The anti-defeat structure allows the plunger's disengagement from the latch when the magnetic field is being applied to the security tag by absorbing energy while the plunger is being attracted to a magnetic field source (e.g., field source 1108 of FIG. 11). The anti-defeat structure allows the plunger to travel a first distance (e.g., distance 910 of FIG. 9) in a direction away from the latch when the magnetic field is being applied to the security tag, and a second distance (e.g., distance 810 of FIG. 8) in a direction away from the latch when the impact force is being applied to the security tag. The first distance is greater than the second distance. Subsequent to completing 1008, 1010 is performed where method 1000 ends or other actions are performed (e.g., return to 1004).

In some scenarios, the anti-defeat structure comprises an impact mass that is resiliently biased towards the plunger by an impact spring. The impact mass is disposed between the plunger and the impact spring, and is in contact with the plunger at all times. The impact spring is in a compressed state when the energy is being absorbed by the anti-defeat structure, and transitions from the compressed state to an uncompressed state when the anti-defeat structure releases the energy. The impact spring causes the impact mass to apply a pushing force to the plunger as the energy is being released by the anti-defeat structure. The pushing force causes the plunger to travel towards the latch and remain engaged with the latch despite the application of the impact force.

Figure 11:
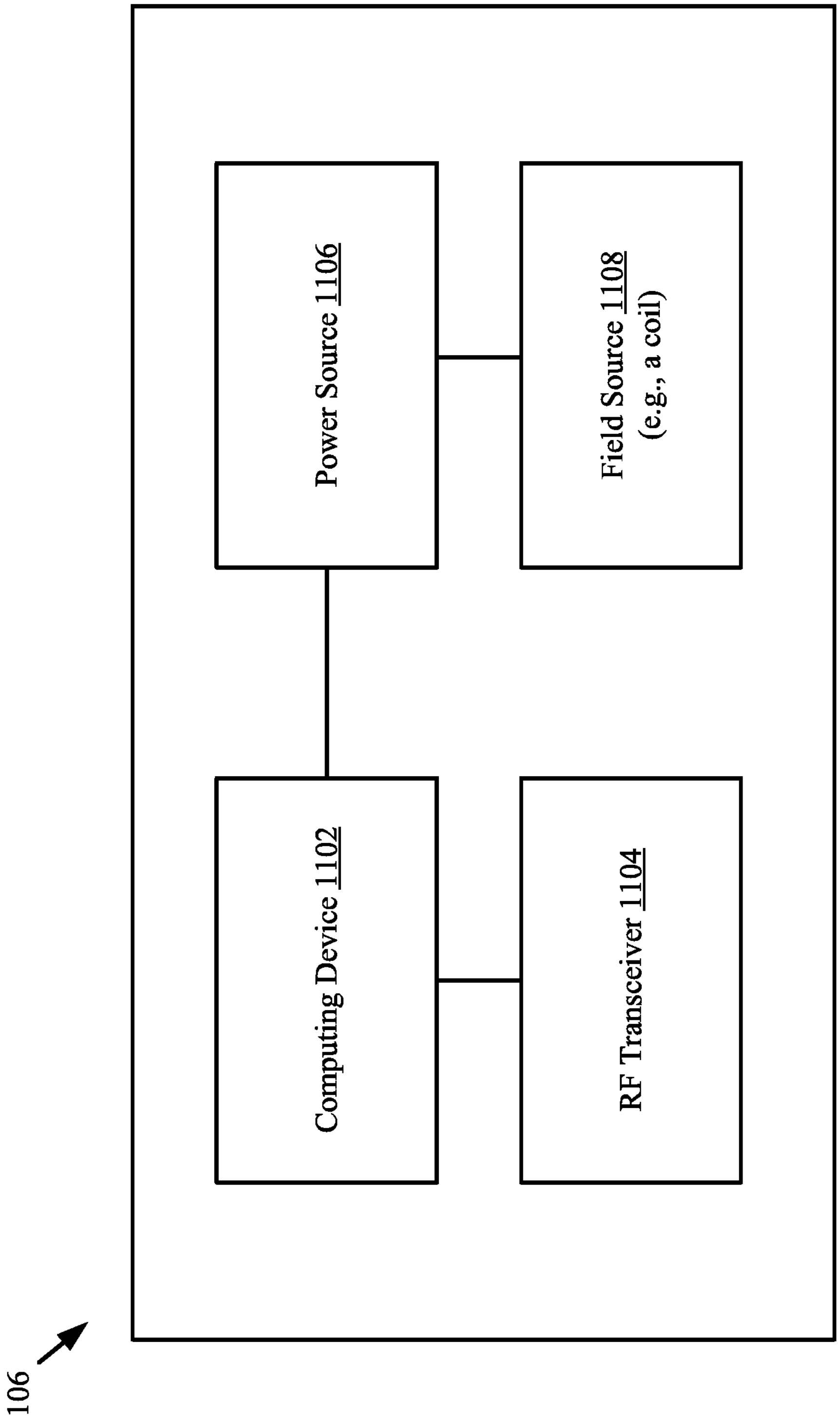
FIG. 11 provides an illustration of an illustrative architecture for a detaching unit FIG. 12 provides an illustration of an illustrative architecture for a computing device.

As shown in FIG. 11, the detaching unit 106 comprises a computing device 1102, an RF transceiver 1104, a power source 1106 (e.g., AC mains), and a field source 1108 (e.g., a coil). RF transceivers, power sources and field sources are well known in the art, and therefore will not be described in detail herein. Still, it should be noted that the computing device 1102 controls when the RF transceiver 1104 and power source 1106 for performing all or some of the above-described methods for verifying a detachment of a security tag (e.g., security tag 108 of FIG. 1) from an article.

Figure 12:
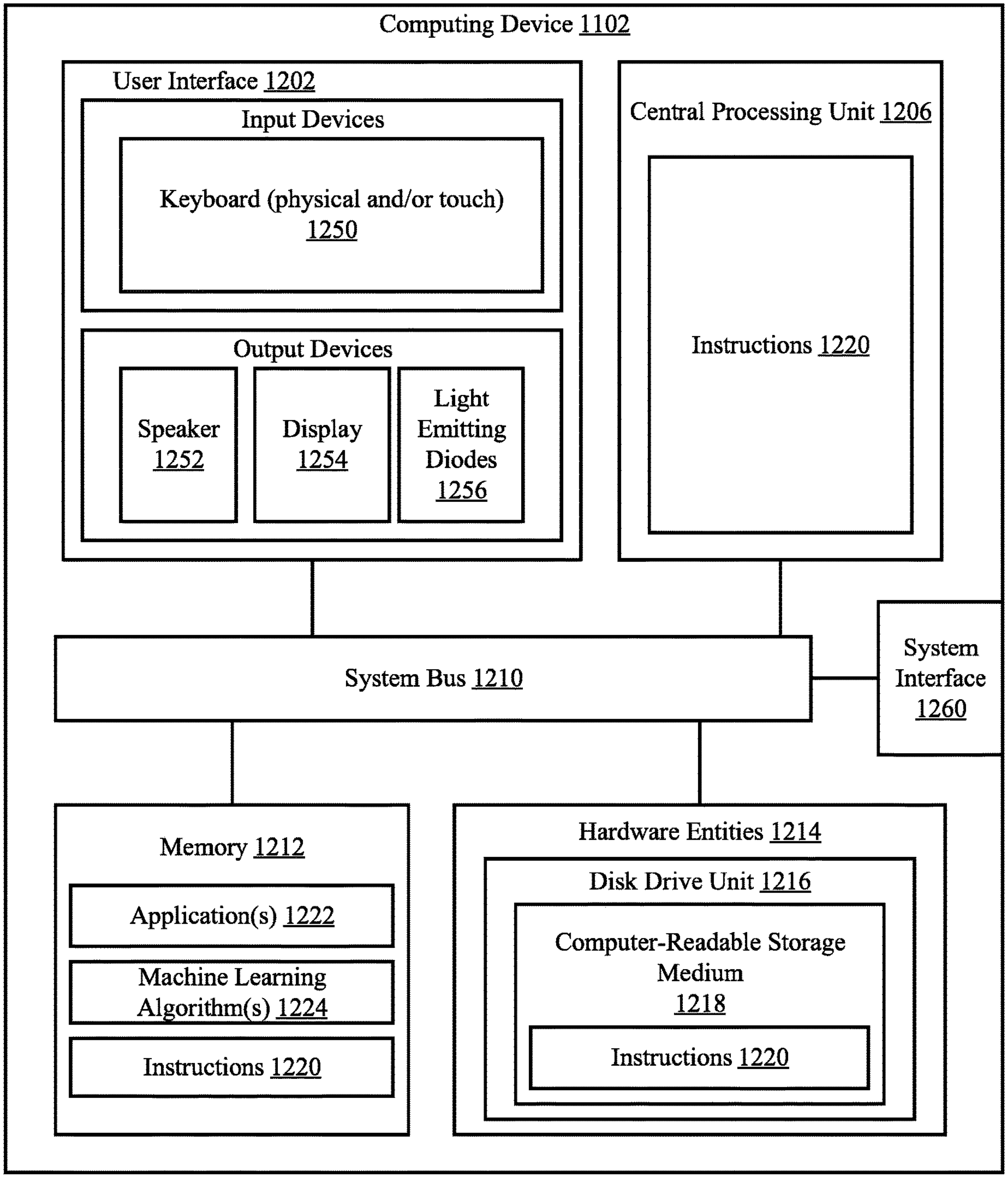

Referring now to FIG. 12, there is provided an illustration of an illustrative architecture for a computing device 1102. Computing device 1102 may include more or less components than those shown in FIG. 12. However, the components shown are sufficient to disclose an illustrative solution implementing the present solution. The hardware architecture of FIG. 12 represents one implementation of a representative computing device configured to provide an improved item return process, as described herein. As such, the computing device 1102 of FIG. 12 implements at least a portion of the method(s) described herein.

Some or all components of the computing device 1200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 12, the computing device 1102 comprises a user interface 1202, a Central Processing Unit ("CPU") 1206, a system bus 1210, a memory 1212 connected to and accessible by other portions of computing device 1102 through system bus 1210, a system interface 1260, and hardware entities 1214 connected to system bus 1210. The user interface can include input devices and output devices, which facilitate user-software interactions for controlling operations of the computing device 1102. The input devices include, but are not limited, a physical and/or touch keyboard 1250. The input devices can be connected to the computing device 1102 via a wired or wireless connection (e.g., a Bluetooth® connection). The output devices include, but are not limited to, a speaker 1252, a display 1254, and/or light emitting diodes 1256. System interface 1260 is configured to facilitate wired or wireless communications to and from external devices (e.g., network nodes such as access points, etc.).

At least some of the hardware entities 1214 perform actions involving access to and use of memory 1212, which can be a Radom Access Memory ("RAM"), a disk driver and/or a Compact Disc Read Only Memory ("CD-ROM"). Hardware entities 1214 can include a disk drive unit 1216 comprising a computer-readable storage medium 1218 on which is stored one or more sets of instructions 1220 (e.g., software code) configured to implement one or more of the methodologies, procedures, or functions described herein. The instructions 1220 can also reside, completely or at least partially, within the memory 1212 and/or within the CPU 1206 during execution thereof by the computing device 1102. The memory 1212 and the CPU 1206 also can constitute machine-readable media. The term "machine-readable media", as used here, refers to a single medium or multiple media (e.g., a centralized or distributed database, and/or associated caches and servers) that store the one or more sets of instructions 1220. The term "machine-readable media", as used here, also refers to any medium that is capable of storing, encoding or carrying a set of instructions 1220 for execution by the computing device 1102 and that cause the computing device 1102 to perform any one or more of the methodologies of the present disclosure.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A security tag body comprising:

a housing; and a magnetic lock mechanism at least partially contained in the housing, the magnetic lock mechanism comprising:

a latch configured to lockingly engage a pin of the tag when the tag is locked and to release the pin when the tag is unlocked;

a plunger;

a latch spring, wherein the latch spring biases a first end of the plunger proximate the latch in a first direction towards the latch, the first end engaging the latch to lockingly engage the pin when the tag is locked and disengaging the latch to release the pin when the tag is unlocked by application of a magnetic force to the plunger in a second direction opposite the first direction;

an impulse mass; and an impulse spring, wherein the impulse mass and impulse spring are each aligned with the plunger along an axis of the first direction, the impulse spring is in contact with the housing and biases the impulse mass in the first direction, and the impulse mass is constrained to move in the second direction against the biasing force of the impulse spring upon movement of the plunger in the second direction.

2. The tag of claim 1, wherein the impulse mass is disposed between the impulse spring and the first end of the plunger.

3. The tag of claim 1, wherein the impulse mass is affixed to the plunger.

4. The tag of claim 1, wherein the impulse mass is adjacent an end of the plunger distal from the first end.

5. The tag of claim 1, wherein the housing forms therein a guide channel on the axis of the first direction and the plunger is seated in the channel.

6. The tag of claim 1, wherein the housing forms therein a slot on the axis of the first direction and the impulse mass is seated in the slot.

7. The tag of claim 1, wherein the impulse mass defines therein a recess to receive a portion of the distal end of the plunger, and the distal end of the plunger is seated in the recess.

* * * * *